(12) United States Patent
Trachewsky et al.

(10) Patent No.: US 7,646,703 B2
(45) Date of Patent: Jan. 12, 2010

(54) BACKWARD-COMPATIBLE LONG TRAINING SEQUENCES FOR WIRELESS COMMUNICATION NETWORKS

(75) Inventors: Jason Alexander Trachewsky, Menlo Park, CA (US); Rajendra T. Moorti, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 903 days.

(21) Appl. No.: 11/188,771

(22) Filed: Jul. 26, 2005

(65) Prior Publication Data

US 2006/0120447 A1 Jun. 8, 2006

Related U.S. Application Data

(60) Provisional application No. 60/591,104, filed on Jul. 27, 2004, provisional application No. 60/634,102, filed on Dec. 8, 2004.

(51) Int. Cl.
*H04J 11/00* (2006.01)
(52) U.S. Cl. ........................ 370/208; 370/210
(58) Field of Classification Search ................ 370/208, 370/210
See application file for complete search history.

(56) References Cited

U.S. PATENT DOCUMENTS

| 7,203,245 | B1 * | 4/2007 | Murphy .................... 375/260 |
| 7,254,171 | B2 * | 8/2007 | Hudson .................... 375/229 |
| 7,394,865 | B2 * | 7/2008 | Borran et al. ............ 375/295 |
| 2004/0008803 | A1 * | 1/2004 | Aldrovandi et al. ...... 375/347 |
| 2004/0264585 | A1 * | 12/2004 | Borran et al. ............ 375/260 |
| 2005/0265219 | A1 * | 12/2005 | Murphy et al. ........... 370/208 |
| 2006/0209890 | A1 * | 9/2006 | MacMullan et al. ...... 370/468 |
| 2006/0209892 | A1 * | 9/2006 | MacMullan et al. ...... 370/468 |
| 2007/0002749 | A1 * | 1/2007 | Sondur et al. ............ 370/238 |
| 2007/0047671 | A1 * | 3/2007 | Chen ....................... 375/326 |

* cited by examiner

*Primary Examiner*—Andrew Lee
(74) *Attorney, Agent, or Firm*—McAndrews, Held & Malloy, Ltd.

(57) ABSTRACT

A network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 52 sub-carriers.

27 Claims, 5 Drawing Sheets

| Sub-carrier index | -28 | -27 | -26 | -25 | -24 | -23 | -22 | -21 | -20 | -19 | -18 | -17 | -16 | -15 |
|---|---|---|---|---|---|---|---|---|---|---|---|---|---|---|
| Value | +1 | +1 | 1 | 1 | -1 | -1 | 1 | 1 | -1 | 1 | -1 | 1 | 1 | 1 |

| Sub-carrier index | -14 | -13 | -12 | -11 | -10 | -9 | -8 | -7 | -6 | -5 | -4 | -3 | -2 | -1 | 0 |
|---|---|---|---|---|---|---|---|---|---|---|---|---|---|---|---|
| Value | 1 | 1 | 1 | -1 | -1 | 1 | 1 | -1 | 1 | -1 | 1 | 1 | 1 | 1 | 0 |

| Sub-carrier index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Value | +1 | 1 | -1 | 1 | 1 | -1 | 1 | -1 | 1 | -1 | -1 | -1 | -1 | -1 |

| Sub-carrier index | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Value | 1 | 1 | -1 | -1 | 1 | -1 | -1 | -1 | 1 | 1 | 1 | 1 | -1 | -1 |

LONG TRAINING SEQUENCE FOR 56 ACTIVE

FIGURE 4

| Sub-carrier index | Value |
|---|---|
| -32 | -1 |
| -31 | -1 |
| -30 | +1 |
| -29 | +1 |
| -28 | +1 |
| -27 | +1 |
| -26 | 1 |
| -25 | 1 |
| -24 | -1 |
| -23 | -1 |
| -22 | 1 |
| -21 | 1 |
| -20 | -1 |
| -19 | 1 |
| -18 | -1 |
| -17 | 1 |
| -16 | 1 |
| -15 | 1 |
| -14 | 1 |
| -13 | 1 |
| -12 | 1 |
| -11 | -1 |
| -10 | -1 |
| -9 | 1 |
| -8 | 1 |
| -7 | -1 |
| -6 | 1 |
| -5 | -1 |
| -4 | 1 |
| -3 | 1 |
| -2 | 1 |
| -1 | 1 |
| 0 | 0 |
| 1 | +1 |
| 2 | -1 |
| 3 | -1 |
| 4 | 1 |
| 5 | 1 |
| 6 | -1 |
| 7 | 1 |
| 8 | -1 |
| 9 | 1 |
| 10 | -1 |
| 11 | -1 |
| 12 | -1 |
| 13 | -1 |
| 14 | -1 |
| 15 | 1 |
| 16 | 1 |
| 17 | -1 |
| 18 | -1 |
| 19 | 1 |
| 20 | 1 |
| 21 | -1 |
| 22 | 1 |
| 23 | -1 |
| 24 | 1 |
| 25 | 1 |
| 26 | 1 |
| 27 | -1 |
| 28 | -1 |
| 29 | -1 |
| 30 | +1 |
| 31 | -1 |

LONG TRAINING SEQUENCE FOR 63 ACTIVE

FIGURE 5

BACKWARD-COMPATIBLE LONG TRAINING SEQUENCES FOR WIRELESS COMMUNICATION NETWORKS

This application claims benefit under 35 U.S.C §119(e) of provisional application No. 60/591,104, filed on Jul. 27, 2004 and provisional application No. 60/634,102 filed on Dec. 8, 2004, the contents of which is hereby incorporated by reference.

BACKGROUND OF THE INVENTION

1. Field of the Invention

The present invention relates generally to wireless communication systems and more particularly to long training sequences of minimum peak-to-average power ratio which may be used by legacy systems.

2. Description of the Related Art

Each wireless communication device participating in wireless communications includes a built-in radio transceiver (i.e., receiver and transmitter) or is coupled to an associated radio transceiver. As is known to those skilled in the art, the transmitter typically includes a data modulation stage, one or more intermediate frequency stages, and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

The receiver is typically coupled to the antenna and includes a low noise amplifier, one or more intermediate frequency stages, a filtering stage, and a data recovery stage. The low noise amplifier receives, via the antenna, inbound RF signals and amplifies the inbound RF signals. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with a particular wireless communication standard.

Different wireless devices in a wireless communication system may be compliant with different standards or different variations of the same standard. For example, 802.11a an extension of the 802.11 standard, provides up to 54 Mbps in the 5 GHz band. 802.11b, another extension of the 802.11 standard, provides 11 Mbps transmission (with a fallback to 5.5, 2 and 1 Mbps) in the 2.4 GHz band. 802.11g, another extension of the 802.11 standard, provides 20+ Mbps in the 2.4 GHz band. 802.11n, a new extension of 802.11, is being developed to address, among other thins, higher throughput and compatibility issues. An 802.11a compliant communications device may reside in the same WLAN as a device that is compliant with another 802.11 standard. When devices that are compliant with multiple versions of the 802.11 standard are in the same WLAN, the devices that are compliant with older versions are considered to be legacy devices. To ensure backward compatibility with legacy devices, specific mechanisms must be employed to insure that the legacy devices know when a device that is compliant with a newer version of the standard is using a wireless channel to avoid a collision. New implementations of wireless communication protocol enable higher speed throughput, while also enabling legacy devices which might be only compliant with 802.11a or 802.11g to communicate in systems which are operating at higher speeds.

Devices implementing both the 802.11a and 802.11g standards use an orthogonal frequency division multiplexing (OFDM) encoding scheme. OFDM is a frequency division multiplexing modulation technique for transmitting large amounts of digital data over a radio wave. OFDM works by spreading a single data stream over a band of sub-carriers, each of which is transmitted in parallel. In 802.11a and 802.11g compliant devices, only 52 of the 64 active sub-carriers are used. Four of the active sub-carriers are pilot sub-carriers that the system uses as a reference to disregard frequency or phase shifts of the signal during transmission. The remaining 48 sub-carriers provide separate wireless pathways for sending information in a parallel fashion. The 52 sub-carriers are modulated using binary or quadrature phase shift keying (BPSK/QPSK), 16 Quadrature Amplitude Modulation (QAM), or 64 QAM. Therefore, 802.11a and 802.11g compliant devices use sub-carriers −26 to +26, with the 0-index sub-carrier set to 0 and 0-index sub-carrier being the carrier frequency. As such, only part of the 20 Mhz bandwidth supported by 802.11a and 802.11g is use.

In 802.11a/802.11g, each data packet starts with a preamble which includes a short training sequence followed by a long training sequence. The short and long training sequences are used for synchronization between the sender and the receiver. The long training sequence of 802.11a and 802.11g is defined such that each of sub-carriers −26 to +26 has one BPSK constellation point, either +1 or −1.

There exists a need to create a long training sequence of minimum peak-to-average ratio that uses more sub-carriers without interfering with adjacent channels. The inventive long trains sequence with a minimum peak-to-average power ratio should be usable by legacy devices in order to estimate channel impulse response and to estimate carrier frequency offset between a transmitter and a receiver.

SUMMARY OF THE INVENTION

According to one aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 52 sub-carriers.

According to another aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 56 sub-carriers.

According to another aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 63 sub-carriers.

According to another aspect of the invention, there is provided a method for generating an expanded long training sequence with a minimal peak-to-average ratio. The method includes the steps of generating the expanded long training sequence and producing an optimal expanded long training sequence with a minimal peak-to-average ratio. The method also includes the step of storing the expanded long training sequence and the optimal expanded long training sequence on more than 52 sub-carriers

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 4 illustrates the long training sequence that is used in 56 active sub-carriers; and FIG. 5 illustrates the long training sequence that is used in 63 active sub-carriers.

DETAILED DESCRIPTION OF THE INVENTION

Reference will now be made to the preferred embodiments of the present invention, examples of which are illustrated in the accompanying drawings.

Figure 1:
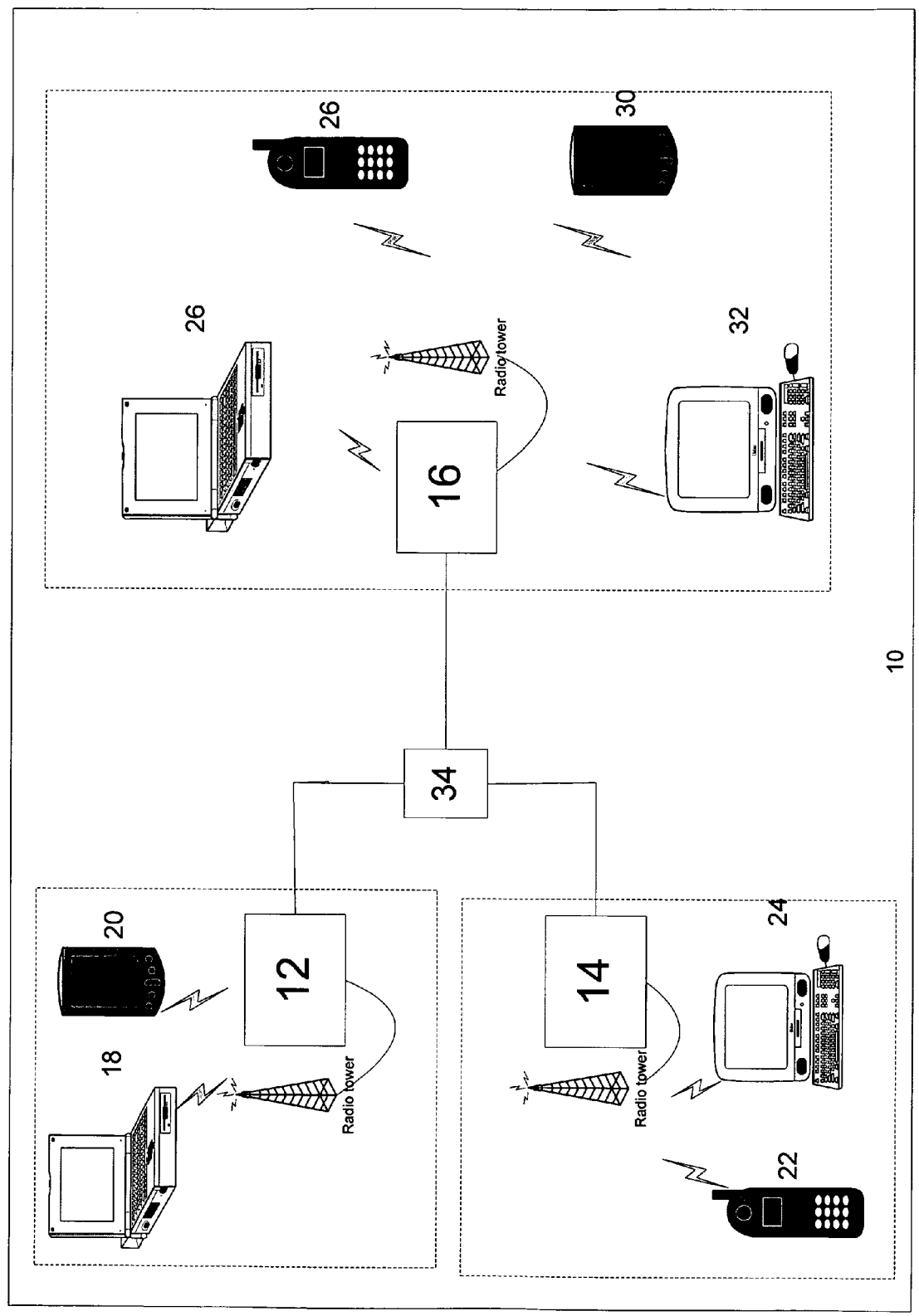
FIG. 1 illustrates a communication system that includes a plurality of base stations, a plurality of wireless communication devices and a network hardware component.

FIG. 1 illustrates a communication system 10 that includes a plurality of base stations and/or access points 12-16, a plurality of wireless communication devices 18-32 and a network hardware component 34. Wireless communication devices 18-32 may be laptop computers 18 and 26, personal digital assistant hosts 20 and 30, personal computer 24 and 32 and/or cellular telephone 22 and 28. Base stations or access points 12-16 are operably coupled to network hardware 34 via local area network connections 36, 38 and 40. Network hardware 34, for example a router, a switch, a bridge, a modem, or a system controller, provides a wide area network connection for communication system 10. Each of base stations or access points 12-16 has an associated antenna or antenna array to communicate with the wireless communication devices in its area. Typically, the wireless communication devices register with a particular base station or access point 12-14 to receive services from communication system 10. Each wireless communication device includes a built-in radio or is coupled to an associated radio. The radio includes at least one radio frequency (RF) transmitter and at least one RF receiver.

The present invention provides an expanded long training sequence of minimum peak-to-average power ratio and thereby decreases power back-off. The inventive expanded long training sequence may be used by 802.11a or 802.11g devices for estimating the channel impulse response and by a receiver for estimating the carrier frequency offset between the transmitter clock and receiver clock. The inventive expanded long training sequence is usable by 802.11a or 802.11g systems only if the values at sub-carriers −26 to +26 are identical to those of the current long training sequence used in 802.11a and 802.11g systems. As such, the invention utilized the same +1 or −1 binary phase shift key (BPSK) encoding for each new sub-carrier and the long training sequence of 802.11a or 802.11g systems is maintained in the present invention.

In a first embodiment of the invention, the expanded long training sequence is implemented in 56 active sub-carriers including sub-carriers −28 to +28. In another embodiment, an expanded long training sequence is implemented using 63 active sub-carriers, i.e., all of the active sub-carriers (−32 to +31) except the 0-index sub-carrier which is set to 0. In both embodiments of the invention, orthogonality is not affected, since a 64-point orthogonal transform is used to generate the time-domain sequence. Additionally, the output of an auto-correlator for computing the carrier frequency offset is not affected by the extra sub-carriers.

Figure 2:
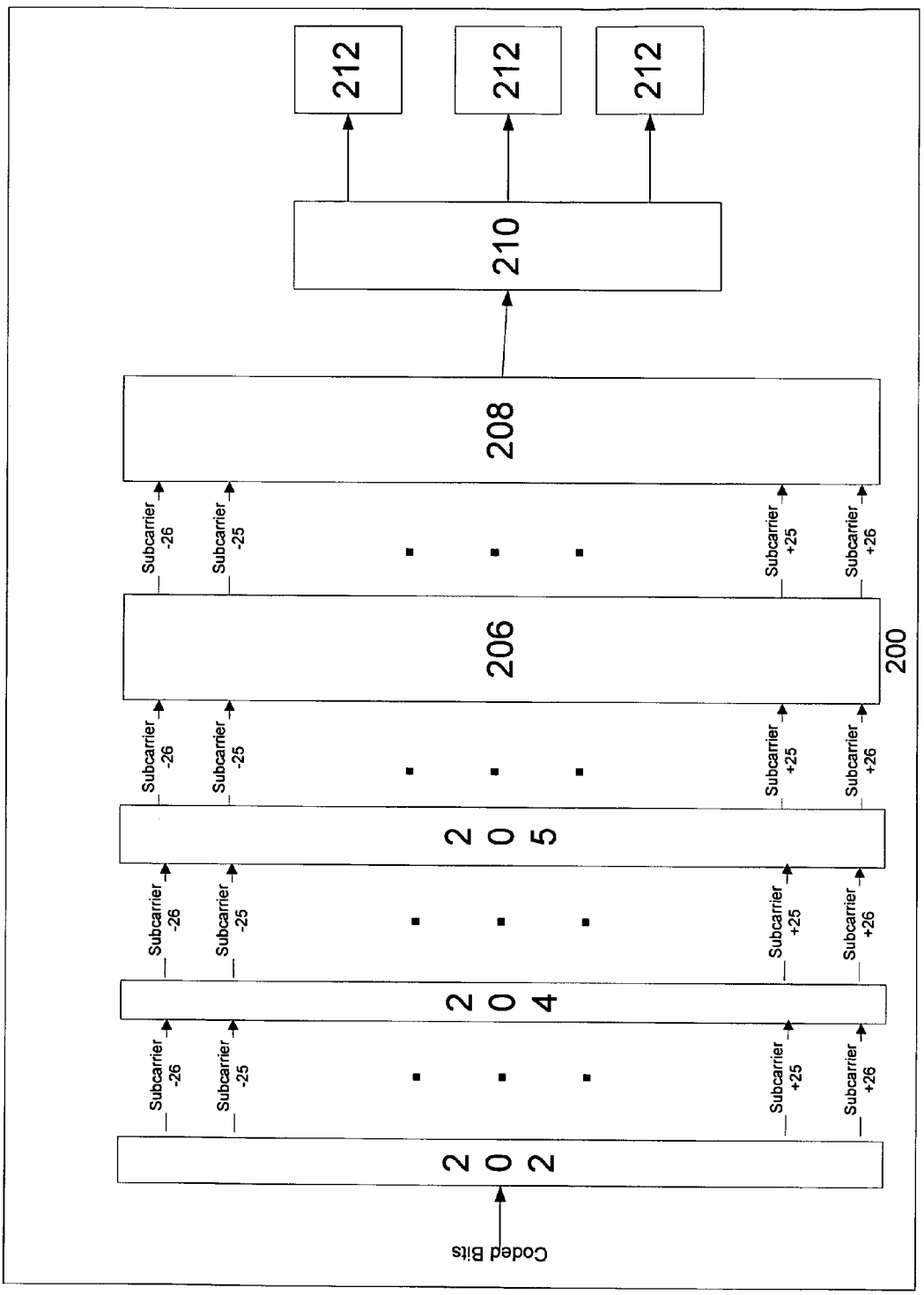
FIG. 2 illustrates a schematic block diagram of a processor that is configured to generate an expanded long training sequence.

FIG. 2 illustrates a schematic block diagram of a processor that is configured to generate an expanded long training sequence. Processor 200 includes a symbol mapper 202, a frequency domain window 204, a signal generating circuit 205, an inverse fast Fourier transform (IFFT) module 206, a serial to parallel module 208, a digital transmit filter and/or time domain window module 210, and digital to analog converters (D/A) 212. For an expanded long training sequence, symbol mapper 202 generates symbols from the coded bits for each of the 64 subcarriers of an OFDM sequence. Frequency domain window 204 applies a weighting factor on each subcarrier. Signal generating circuit 205 generates the expanded long training sequence and if 56 active sub-carriers are being used, signal generating circuit generates the expanded long training sequence and stores the expanded long training sequence in sub-carriers −28 to +28. If 63 active sub-carriers are being used, signal generating circuit generates the expanded long training sequence and stores the expanded long training sequence in sub-carriers −32 to +32 i.e., all of the active sub-carriers (−32 to +31) except the 0-index sub-carrier which is set to 0. The inventive long training sequence is inputted into an Inverse Fourier Transform 206. The invention uses the same +1 or −1 BPSK encoding for each new sub-carrier. Inverse Fourier Transform 206 may be an inverse Fast Fourier Transform (IFFT) or Inverse Discrete Fourier Transform (IFDT). Inverse Fourier Transform 206 processes the long training sequence from signal generating circuit 205 and thereafter produces an optimal expanded long training sequence with a minimal peak-to-average power ratio. The optimal expanded long training sequence may be used in either 56 active sub-carriers or 63 active subscribers. Serial to parallel module 208 converts the serial time domain signals into parallel time domain signals that are subsequently filtered and converted to analog signals via the D/A.

Figure 3:
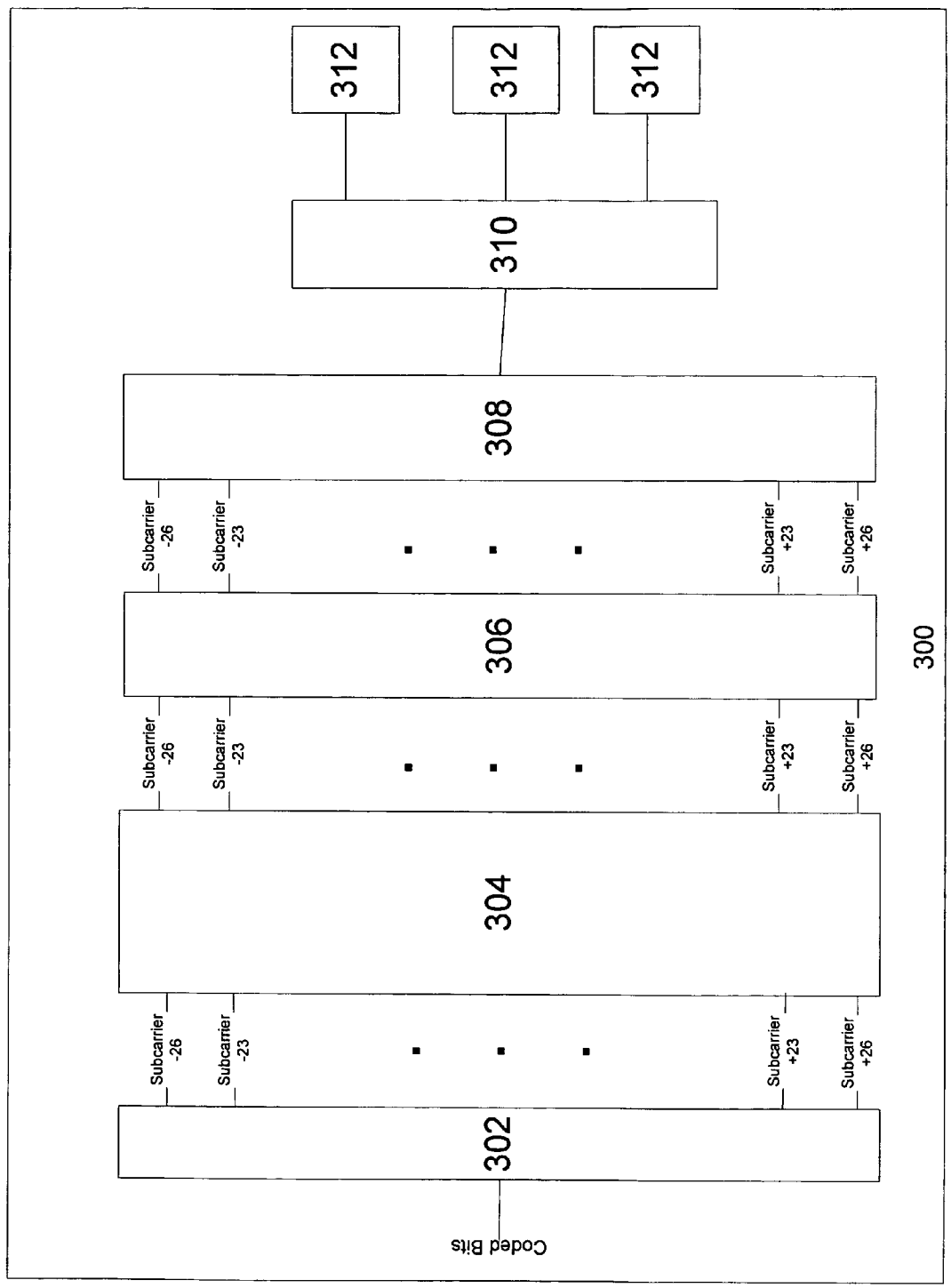
FIG. 3 is a schematic block diagram of a processor that is configured to process an expanded long training sequence.

FIG. 3 is a schematic block diagram of a processor that is configured to process an expanded long training sequence. Processor 300 includes a symbol demapper 302, a frequency domain window 304, a fast Fourier transform (FFT) module 306, a parallel to serial module 308, a digital receiver filter and/or time domain window module 310, and analog to digital converters (A/D) 312. A/D converters 312 convert the sequence into digital signals that are filtered via digital receiver filter 310. Parallel to serial module 308 converts the digital time domain signals into a plurality of serial time domain signals. FFT module 306 converts the serial time domain signals into frequency domain signals. Frequency domain window 304 applies a weighting factor on each frequency domain signal. Symbol demapper 302 generates the coded bits from each of the 64 subcarriers of an OFDM sequence received from the frequency domain window.

FIG. 4 illustrates the long training sequence with a minimum peak-to-average power ratio that is used in 56 active sub-carriers. Out of the 16 possibilities for the four new sub-carrier positions, the sequence illustrated in FIG. 4 has the minimum peak-to-average power ratio, i.e., a peak-to-average power ratio of 3.6 dB.

FIG. 5 illustrates the long training sequence with a minimum peak-to-average power ratio that is used in 63 active sub-carriers. Out of the 2048 possibilities for the eleven new sub-carrier positions, the sequence illustrated in FIG. 5 has the minimum peak-to-average power ratio, i.e., a peak-to-average power ratio of 3.6 dB.

It should be appreciated by one skilled in art, that the present invention may be utilized in any device that implements the OFDM encoding scheme. The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for generating an expanded long training sequence with a minimal peak-to-average ratio, the network device comprising:
    a signal generating circuit that generates the expanded long training sequence; and
    an Inverse Fourier Transformer that processes the expanded long training sequence from the signal generating circuit and that produces an optimal expanded long training sequence with a minimal peak-to-average ratio,
    wherein the expanded long training sequence and the optimal expanded long training sequence are stored on a greater number of subcarriers than a standard configuration for Orthogonal Frequency Division Multiplexing scheme.

2. The network device of claim 1, wherein the expanded long training sequence and the optimal expanded long training sequence are stored on 56 active sub-carriers.

3. The network device of claim 2, wherein the optimal expanded long training sequence has a minimum peak-to-average power ratio of 3.6 dB.

4. The network device of claim 1, wherein the expanded long training sequence and the optimal expanded long training sequence are stored on 63 active sub-carriers.

5. The network device of claim 3, wherein the optimal expanded long training sequence has a minimum peak-to-average power ratio of 3.6 dB.

6. The network device of claim 1, wherein a binary phase shift key encoding is used for each sub-carrier above the +26 indexed sub-carrier and below the −26 indexed sub-carrier.

7. The network device of claim 1, wherein the Inverse Fourier Transformer is an Inverse Fast Fourier Transformer.

8. The network device of claim 1, wherein the Inverse Fourier Transformer is an Inverse Discrete Fourier Transformer.

9. A network device for generating an expanded long training sequence with a minimal peak-to-average ratio, the network device comprising:
    a signal generating circuit configured to generate the expanded long training sequence; and
    an Inverse Fourier Transformer configured to process the expanded long training sequence from the signal generating circuit and configured to produce an optimal expanded long training sequence with a minimal peak-to-average ratio,
    wherein the expanded long training sequence and the optimal expanded long training sequence are stored on 56 active sub-carriers.

10. A network device for generating an expanded long training sequence with a minimal peak-to-average ratio, the network comprising:
    a signal generating circuit configured to generate the expanded long training sequence; and
    an Inverse Fourier Transformer configured to process the expanded long training sequence from the signal generating circuit and configured to produce an optimal expanded long training sequence with a minimal peak-to-average ratio,
    wherein the expanded long training sequence and the optimal expanded long training sequence are stored on 63 active sub-carriers.

11. A method for generating an expanded long training sequence with a minimal peak-to-average ratio in a wireless communication device, the method comprising:
    generating, by the wireless communication device, the expanded long training sequence;
    producing, by the wireless communication device, an optimal expanded long training sequence with a minimal peak-to-average ratio; and
    storing, by the wireless communication device, the expanded long training sequence and the optimal expanded long training sequence on more than 52 sub-carriers.

12. The method of claim 11, wherein said storing comprises storing the expanded long training sequence and the optimal expanded long training sequence on 56 active sub-carriers.

13. The method of claim 12, wherein said producing comprises producing the optimal expanded long training sequence with a minimum peak-to-average power ratio of 3.6 dB.

14. The method of claim 11, wherein said storing comprises storing the expanded long training sequence and the optimal expanded long training sequence on 63 active sub-carriers.

15. The method of claim 14, wherein said producing comprises producing the optimal expanded long training sequence with a minimum peak-to-average power ratio of 3.6 dB.

16. The network device of claim 1, wherein the network device is a personal digital assistant.

17. The network device of claim 1, wherein the network device is a laptop computer.

18. The network device of claim 1, wherein the network device is a cellular telephone.

19. The network device of claim 9, wherein the network device is a personal digital assistant.

20. The network device of claim 9, wherein the network device is a laptop computer.

21. The network device of claim 9, wherein the network device is a cellular telephone.

22. The network device of claim 10, wherein the network device is a personal digital assistant.

23. The network device of claim 10, wherein the network device is a laptop computer.

24. The network device of claim 10, wherein the network device is a cellular telephone.

25. The method of claim 11, wherein the wireless communication device is a personal digital assistant.

26. The method of claim 11, wherein the wireless communication device is a laptop computer.

27. The method of claim 11, wherein the wireless communication device is a cellular telephone.

* * * * *